April 12, 1966 G. P. KATONA 3,246,204
ELECTROLUMINESCENT DIGITAL DISPLAY DEVICE
Filed March 21, 1962 2 Sheets-Sheet 1

April 12, 1966    G. P. KATONA    3,246,204
ELECTROLUMINESCENT DIGITAL DISPLAY DEVICE
Filed March 21, 1962    2 Sheets-Sheet 2

United States Patent Office 3,246,204
Patented Apr. 12, 1966

3,246,204
ELECTROLUMINESCENT DIGITAL DISPLAY
DEVICE
Gabriel P. Katona, New York, N.Y., assignor to Corning
Glass Works, Corning, N.Y., a corporation of New
York
Filed Mar. 21, 1962, Ser. No. 181,361
6 Claims. (Cl. 315—313)

The present invention relates to electroluminescent devices and more particularly to electroluminescent devices for the display of digital information.

As is well known in the art, electroluminescent cells produce light by subjecting a suitable phosphor to an electric field. In general, such cells comprise a glass plate having a light transmitting electrically conductive coating on one surface thereof, a layer of phosphor containing material deposited over the electrically conductive coating, sometimes a layer of insulating material overlying the phosphor layer, and finally an electrically conductive coating or plate overlying the phosphor layer or, if provided, the insulating layer. The phosphor material may with advantage be embedded in any suitable dielectric material, for example, as described in United States Patent No. 2,566,349 to Mager, issued September 4, 1951. Where the phosphor particles are embedded in a dielectric material, the separate insulating layer may be omitted.

In the design of instruments for the visual observation of digital information, easy and accurate readout is an important consideration. Accurate reading in an observation of short duration, such as the usual observation of an automobile speedometer, is facilitated by presenting the information in digital rather than analog form. However, digital readout is subject to the disadvantage that numerical reversal may occur in the mind of the observer. Thus, for example, a digital display of the numeral "65" might be read hurriedly as "56." In an analog type of display, the digital information is seen in relation to neighboring scale values or in an accustomed dial area which will tend to prevent such a revesal error. In accordance with the invention, digital information may be displayed in digital form but in a particular area or in association with neighboring digits so as to minimize the likelihood of a reversal error in reading.

An important object of the invention has been the provision of an electroluminescent structure which affords an improved digital readout by illuminating selected digits of a modified analog panel without illuminating any of the neighboring values on the panel or by providing a substantial illumination differential or contrast between the selected digits and neighboring values.

Another object of the invention has been the provision of an electroluminescent structure of the above type which affords a good contrast even under adverse ambient light conditions.

Still another object of the invention has been the provision of an electroluminescent structure of the above type in which band or range switching can easily be effected.

A further object of the invention has been the provision of a digital display panel which provides a desirable level of illumination with a low power consumption.

Other and further objects, features and advantages of the invention will appear more fully from the following description of the invention.

The invention will now be described in greater detail with reference to the appended drawings, in which.

Figure 1:
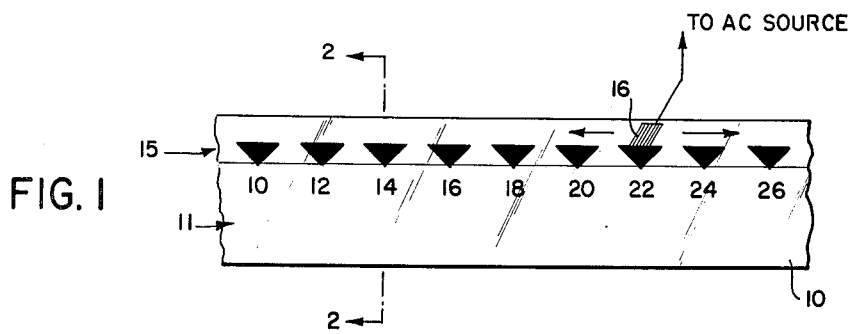
FIG. 1 is a front elevational view, partly schematic, of a portion of a dial embodying the invention.
Figure 2:
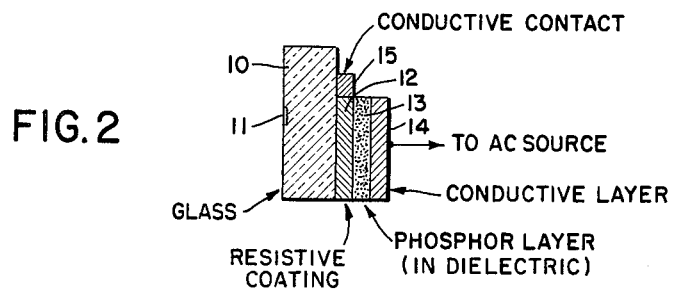
FIG. 2 is a sectional view taken along the line 2—2 of FIG. 1 and with the thickness dimension greatly exaggerated.

Referring now to the drawings, and more particularly to FIGS. 1 and 2, the electroluminescent display device comprises a transparent plate 10 which may be made of glass or plastic and which bears on the surface or interior thereof the numerals or other information to be displayed, the numerals being arranged in a horizontal line 11 with individual digits or groups of digits spaced apart. To apply the digits to the surface of the plate 10, any of the usual decorating practices may be used, e.g., decalcomania or silk-screening. To apply the digits on the interior of the plate 10, photosensitive glass could be used to advantage.

In the usual electroluminescent device, the glass substrate is provided with an electrically conductive coating or layer on one side. The corresponding layer in the device of FIGS. 1 and 2 is designated 12 and is electrically resistive rather than conductive. The layer 12, which may be applied to the plate 10 in the form of a coating, should have a relatively high resistivity, but should be as transparent as possible. Coatings of the type described in United States Patent No. 2,564,706, issued August 21, 1951 to J. M. Mochel, are suitable for this purpose.

An electroluminescent phosphor layer 13 is applied over the resistive layer 12, and an electrically conductive metallic layer 14 is applied over the layer 13. The layer 14 might be, for example, a vacuum evaporated aluminum layer. The phosphor layer 13 may be separated from the metallic layer 14 by a sheet of insulation, but it is preferable to provide this insulation by embedding the phosphor in a suitable dielectric material.

A row of spaced conductive contact dots 15 is applied to the inner surface of the plate 10 above the row of numerals 11. A respective one of the contact dots 15 is provided for each of the digits in row 11. The contact dots 15 may be triangular or trapezoidal in shape with the apex or narrow end in contact with the upper edge of resistive coating 12. The contact dots 15 could conveniently be made of silver paste fired on the glass surface.

One terminal of the electrical power source is connected to a brush or similar movable conducting element shown schematically at 16 in FIG. 1. The other terminal of the electrical power source is connected to the layer 14. Brush 16 is movable along the row of contact dots 15 so as successively to make electrical contact with adjacent contact dots. The brush 16 is controlled by the mechanism responsive to the quantity to be displayed. For example, the brush 16 might be controlled by the speedometer mechanism of an automobile so as to move back and forth along the row of contact dots 15 as the speed of the automobile changes.

The ends of the bases of adjacent contact dots 15 are preferably closely spaced so that the brush 16 will bridge, or substantially bridge, the space between adjacent contact dots, and hence will at all times make electrical contact with one of the contact dots 15. If desired, at the point of transition adjacent contact dots 15 may both be wiped simultaneously by brush 16.

When brush 16 is riding on any particular contact dot 15, the full source potential will be applied to the resistive coating 12 at a point directly above the corresponding digit or group of digits. Hence, a maximum light emission will occur from the phosphor layer located beneath the area of this corresponding digit. The voltage drop due to the relatively high resistance of the layer 12 will result in only a small portion of the source potential being available for excitation of the phosphor layer located beneath the area of digits on either side of the corresponding digit, and hence these side digits will be dark, or at most only partially illuminated. By appropriate selection of the resistivity of the layer 12 and the spacings between adjacent digits or groups of digits in row 11, the degree of contrast between the brightly illuminated digit and those on the right and left thereof may be made any desired convenient value.

If the width of brush 16 is selected so as to bridge the spacing between adjacent contact dots, then during the interval of transition when brush 16 is made with two adjacent contact dots 15, the two corresponding digits or groups of digits will be equally illuminated.

The generally triangular shape of the contact dots 15 assures that the brush 16 is always made with one or the other of the contact dots 15 while nevertheless providing a substantial spacing between adjacent contact dots 15 at the point of contact thereof with layer 12. This spacing along the edge of layer 12 facilitates obtaining a substantial voltage drop because of the resulting lineal spacing between this point of contact and the areas of neighboring digits. In order to make a good electrical contact between the contact dots 15 and the resistive coating 12, it is desirable that the narrow ends of the contact dots overlap slightly the adjacent edge portion of the resistive coating.

In order to provide a good contrast between the illuminated digit or group of digits and the neighboring digits or groups of digits, the spacing between the illuminated digit and the associated contact dot should be relatively small so that only a small voltage drop will occur between the associated contact dot and the illuminated digit area of the resistive coating 12. Similarly, the spacing between adjacent digits or groups of digits should be relatively large so that a high voltage drop occurs in the resistive layer 12 between the energized contact dot and the neighboring digits or groups of digits on either side of the illuminated digit.

Figure 3:
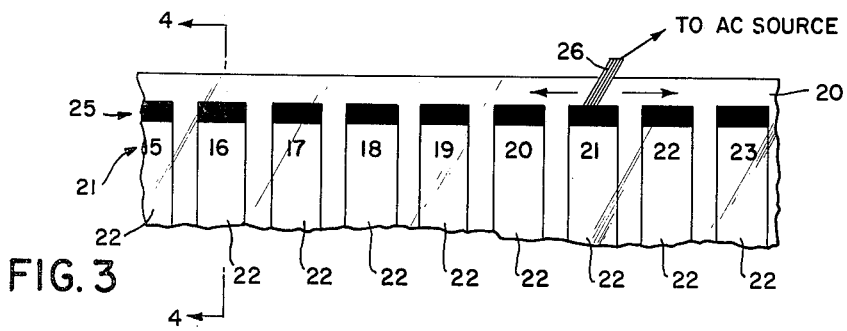
FIG. 3 is a front elevational view similar to FIG. 1 but illustrating a modified form of construction in accordance with the invention.
Figure 4:
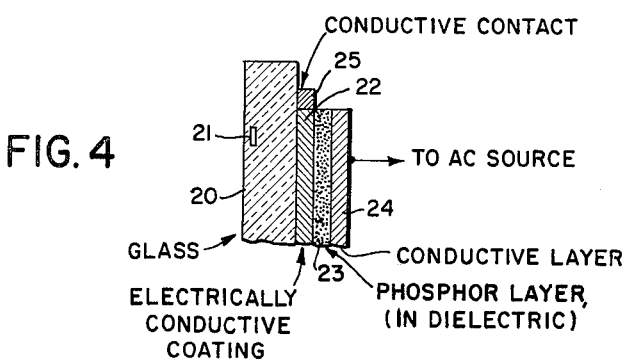
FIG. 4 is a cross-sectional view taken along the line 4—4 of FIG. 3 and with the thickness dimension greatly exaggerated.

In the modified form of construction illustrated in FIGS. 3 and 4, the transparent glass or plastic substrate plate is designated 20. The plate 20 is provided in the interior thereof with a series of spaced digits or spaced groups of digits arranged in a horizontal row 21. The inner surface of plate 20 is provided with a series of vertically arranged, horizontally spaced strips of electrically conductive coating, the electrically conductive strips being designated 22. Each of the strips 22 overlies a respective digit or group of digits of row 21. The surface of plate 20 between the strips 22 may be left uncoated or may be coated with an electrically insulating material. An electroluminescent phosphor layer 23 is applied over each of the strips 22, the phosphor preferably being embedded in a dielectric material. The phosphor layer will thus be in the form of a series of strips overlying the strips 22. An electrically conductive metallic layer 24 is applied over each of the strips of phosphor 23.

A row of spaced conductive contact dots 25 is applied to the inner surface of the plate 20. Each of the contact dots 25 is located above a respective digit or group of digits in the row 21 and is in electrical contact with a respective one of the electrically conductive strips 22. Since adjacent conductive strips 22 are insulated from each other, the contact dots 25 may conveniently be rectangular in shape.

As in the case of FIGS. 1 and 2, a brush or similar movable contact element 26 is connected to one terminal of the power source and is arranged to be movable along the row of contact dots 25 and to make electrical contact with successive ones of contact dots 25 as the brush is moved. If desired, the brush could be arranged to contact directly the conductive strips 22. The other terminal of the power source is connected to the conductive strips 24. If desired, a single conductive layer 24 may be provided overlying all of the phosphor layer. Similarly, single phosphor strips 23 may be provided each overlying a respective one of the electrically conductive strips 22.

In the construction of FIGS. 3 and 4, the phosphor layer overlying the digit or group of digits associated with the particular contact dot 25 being wiped by brush 26 will be subject to the full source potential and there will be no potential gradient across the width of the digit, and hence there will be no brightness gradient. Neighboring digits, however, will be completely dark since adjacent conductive strips 22 are insulated from each other.

Figure 5:
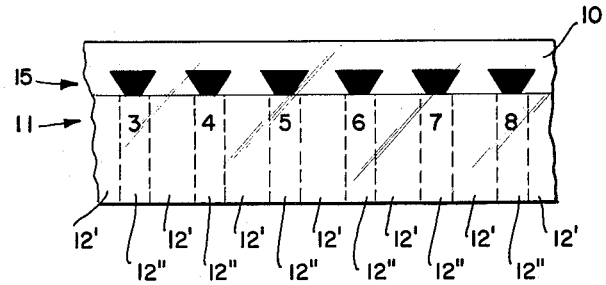
FIG. 5 is a front elevational view similar to FIG. 1 illustrating another modified form of construction.

The brightness gradient across an illuminated digit or group of digits in the construction of FIGS. 1 and 2 may be avoided by the modification shown in FIG. 5. In FIG. 5 the resistive coating 12 is replaced with a series of vertically arranged, horizontally spaced electrically resistive strips 12′ and a like serise of electrically conductive strips 12″ between the respective strips 12′. Each of the strips 12″ overlies the area of a respective digit or group of digits in row 11. Presence of resistive strips 12′ between adjacent digits will result in a substantial voltage drop from the area of an illuminated digit to the areas of neighboring digits, as in the case of FIGS. 1 and 2, but no potential gradient will occur across the area of an illuminated digit.

Figure 6:
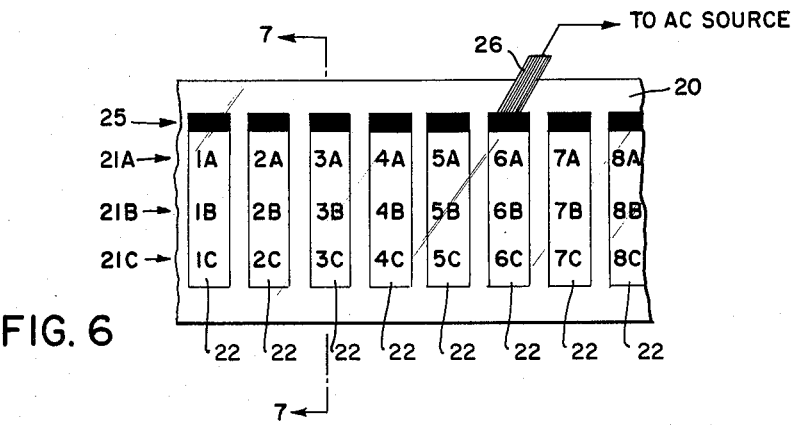
FIG. 6 is a front elevational view similar to FIG. 3 illustrating yet another modified form of construction.
Figure 7:
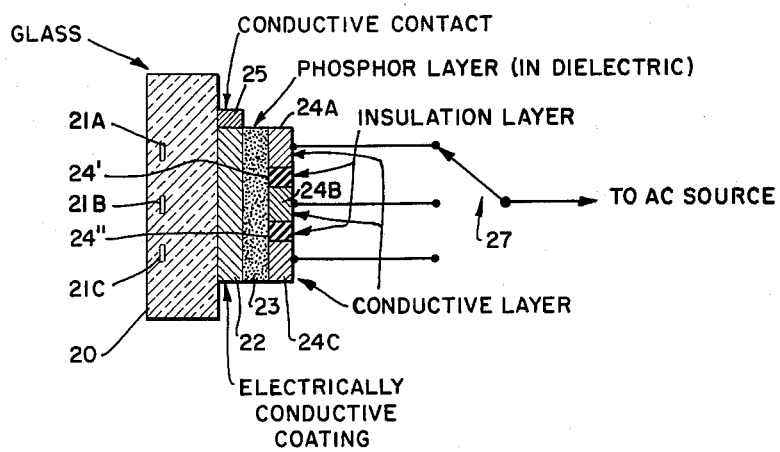
FIG. 7 is a sectional view taken along the line 7—7 of FIG. 6 and with the thickness dimension greatly exaggerated.

FIGS. 6 and 7 illustrate a modified form of construction in which digits or groups of digits may be displayed selectively in ranges. The construction of FIGS. 6 and 7 is similar to that of FIGS. 3 and 4, and like reference numerals have been used. However, the transparent plate 20 is provided with three vertically spaced rows 21A, 21B and 21C, each corresponding to the row 21 of FIGS. 3 and 4. The conductive layer 24 of FIGS. 3 and 4 is divided into three horizontal strips 24A, 24B and 24C, each overlying a respective one of rows 21A, 21B and 21C. The strips 24A and 24B may be separated by a layer of insulation 24′, while the strips 24B and 24C may be separated by a layer of insulation 24″. The strips 24A, 24B and 24C are connected to respective contacts of a three position switch 27. The wiper of switch 27 is connected to the A.C. source.

By appropriately positioning the wiper of switch 27, any one of the rows of digits 21A, 21B and 21C may be conditioned to be illuminated, the particular digit in the conditioned row which is illuminated at any instant depending on the position of brush 26.

For the construction of FIGS. 6 and 7, it is desirable for simplicity that the strips 24A, 24B and 24C, respectively, be continuous. Instead of providing insulation material between the strips 24A, 24B and 24C, the conductive backing layer 24 may be broken into corresponding strips by removing thin strips of the conductive metal. In the case of a vacuum evaporated aluminum layer, this can easily be effected by drawing lines across the aluminum surface.

While the invention has been described in connection with specific embodiments thereof and in specific uses, various modifications thereof will occur to those skilled in the art without departing from the spirit and scope of the invention as set forth in the appended claims. While the invention is particularly suitable for a digital type of display, it will be evident that information of various types may be displayed in accordance with the invention.

What is claimed is:

1. An electroluminescent digital-type display device, comprising a transparent electrically insulating substrate plate bearing a series of spaced apart indicia, a first layer at least partially overlying one side of said plate and having respective portions aligned with each of said indicia, said first layer being formed of a substantially transparent material capable of carrying an electrical current but having a substantial electrical resistance, a second electrically conductive layer aligned with but spaced from said first layer, electroluminescent phosphor means disposed in the space between said layers and being electrically insulated from said layers, a series of spaced electrical contact elements mounted on said plate and each being in electrical contact with said first layer and in alignment with a respective one of said indicia, and movable electrical contact means arranged to traverse successively said contact elements, the electrical resistance of said first layer and the spacings between said contact elements and said portions of said first layer aligned with said indicia being selected so that when an energizing potential is applied to said movable contact means and to said second layer the resulting illumination of the indicia aligned with the contact element contacted by said movable contact means will be substantially greater than the illumination of all others of said indicia and so that an illumination gradient will exist between the indicia aligned with the contact element contacted by said movable contact means and adjacent indica.

2. An electroluminescent digital-type display device, comprising a transparent electrically insulating substrate plate bearing a series of spaced apart indicia arranged in a row across said plate, a first layer at least partially overlying one side of said plate and having respective portions aligned with each of said indicia, said first layer being formed of a substantially transparent material capable of carrying an electrical current but having a substantial electrical resistance, a second electrically conductive layer aligned with but spaced from said first layer, a sheet of electroluminescent phosphor material embedded in a dielectric material, said sheet being disposed between said layers and being arranged to provide a quantity of said phosphor material in alignment with each of said indicia, a series of spaced electrical contact elements mounted in a row on said one side of said plate and each being in electrical contact with said first layer and in alignment with a respective one of said indicia, and movable electrical contact means arranged to traverse said row of contact elements, the spacing between each of said contact elements and the respective portions of said first layer aligned with the corresponding aligned indicia being substantially smaller than the spacing between each of said contact elements and portions of said first layer aligned with all other of said indicia, the electrical resistance of said first layer and said spacings between said contact elements and said portions of said first layer aligned with said indica being selected so that when an energizing potential is applied to said movable contact means and to said second layer the resulting illumination of the indicia aligned with the contact element contacted by said movable contact means will be substantially greater than the illumination of all others of said indicia and so that an illumination gradient will exist between the indicia aligned with the contact element contacted by said movable contact means and adjacent indicia.

3. An electroluminescent digital-type display device as set forth in claim 2 in which said contact elements are generally triangular in shape and with the apexes of the triangles in electrical contact with said first layer and the bases of said triangles lying generally in a common line in the plane of said side of said plate.

4. An electroluminescent digital-type display device, comprising a glass plate bearing a series of spaced apart indicia arranged in a row across one dimension of said plate, a substantially transparent electrically resistive coating at least partially covering one side of said plate and having respective portions aligned with each of said indicia, said coating being capable of carrying an electrical current, an electrically conductive layer aligned with but spaced from said coating, a sheet of electroluminescent phosphor material embedded in a dielectric material, said sheet being disposed between said coating and said layer and being arranged to provide a quantity of said phosphor material in alignment with each of said indicia, a series of spaced generally triangular electrical contact elements mounted in a row on said one side of said plate and each having the apex thereof in electrical contact with said coating and in alignment with a respective one of said indicia, the basis of said contact elements lying generally in a common line, and movable electrical brush means arranged to traverse said row of contact elements, the spacing between each of said contact elements and the respective portions of said coating aligned with the corresponding aligned indicia being substantially smaller than the spacing between each of said contact elements and portions of said coating aligned with all other of said indicia, the electrical resistance of said coating and said spacings between said contact elements and said portions of said coating aligned with said indicia being selected so that when an energizing potential is applied to said movable brush means and to said layer the resulting illumination of the indicia aligned with the contact element contacted by said movable brush means will be substantially greater than the illumination of all others of said indicia and so that an illumination gradient will exist between the indicia aligned with the contact element contacted by said movable brush means and the adjacent indicia.

5. An electroluminescent digital-type display device, comprising a transparent electrically insulating substrate plate bearing a series of spaced apart indicia arranged in a row across said plate, a first layer at least partially overlying one side of said plate and having substantially transparent, parallel, electrically conductive strip portions each aligned with a respective one of said indicia, the remaining portions of said first layer being formed of a material capable of carrying an electrical current but having a substantial electrical resistance, a second electrically conductive layer aligned with but spaced from said first layer, a sheet of electroluminescent phosphor material embedded in a dielectric material, said sheet being disposed between said layers and being arranged to provide a quantity of said phosphor material in alignment with each of said indicia, a series of spaced electrical contact elements mounted in a row on said one side of said plate and each being in electrical contact with said first layer and in alignment with a respective one of said indicia, and movable electrical contact means arranged to traverse said row of contact elements, the electrical resistance of said remaining portions of said first layer being sufficiently great so that when an energizing potential is applied to said movable contact means and to said second layer the resulting illumination of the indicia aligned with the contact element contacted by said movable contact means will be substantially greater than the illumination of all others of said indicia and so that an illumination gradient will exist between the indicia aligned with the contact element contacted by said movable contact means and the adjacent indicia.

6. An electroluminescent digital-type display device, comprising a transparent electrically insulating substrate plate bearing a series of spaced apart information indicia, a first layer at least partially overlying one side of said plate, said first layer having a first respective portion thereof aligned with each of said indicia, at least said first portions of said first layer being substantially transparent and being capable of carrying an electrical current, said first layer having a second respective portion thereof interposed between and electrically interconnecting adjacent ones of said first portions, said second portions of said first layer being capable of carrying an electrical current but having a substantial electrical resistance, a second layer aligned with but spaced from said first layer and having a respective portion thereof aligned with each of said indicia, at least said portions of said second layer being capable of carrying an electrical current, electroluminescent phosphor means disposed in the space between said layers and being electrically insulated from said layers, a series of spaced electrical contact areas on said plate and each being electrically connected to a respective one of said portions of said first layer, and movable electrical contact means adapted and arranged to traverse successively said contact areas whereby when a source of energizing potential is coupled to said movable contact means and to said portions of said second layer an electrical field will be established across the electroluminescent phosphor means disposed between the portion of said first layer connected to the contact area contacted by said contact means and the corresponding aligned portion of said second layer, said electrical field producing illumination of the corresponding aligned indicia, the resistance of said second portions of said first layer being selected so that a minor portion of the energizing potential applied to any one of said contact elements will be transferred to portions of said first layer adjacent the portion of said first layer connected to said one of said contact areas thereby to produce an illumination gradient across the portions of said first layer adjacent the portion of said first layer connected to said one of said contact areas.

References Cited by the Examiner

UNITED STATES PATENTS

| | | | |
|---|---|---|---|
| 2,773,216 | 12/1956 | Emonds | 315—169 |
| 2,847,602 | 8/1958 | Michlin | 313—108 |
| 2,867,739 | 1/1959 | Michlin | 40—132 |
| 2,880,346 | 3/1959 | Nicoll et al. | 250—71 X |
| 2,922,912 | 1/1960 | Miller | 313—108 |
| 2,932,770 | 4/1960 | Livingston | 315—151 |
| 2,955,231 | 10/1960 | Aiken | 315—169 |
| 2,975,318 | 3/1961 | Nicoll | 313—108 |
| 2,999,958 | 9/1961 | Bowerman | 313—108 |
| 3,043,961 | 7/1962 | Kazan | 250—213 |

GEORGE N. WESTBY, *Primary Examiner.*

C. R. CAMPBELL, *Assistant Examiner.*